(12) United States Patent
Glavinic et al.

(10) Patent No.: US 11,249,470 B2
(45) Date of Patent: Feb. 15, 2022

(54) METHOD AND SYSTEM FOR CONTROLLING VEHICLE FUNCTIONS

(71) Applicant: WABCO Europe BVBA, Brussels (BE)

(72) Inventors: Andelko Glavinic, Sarstedt (DE); Ulf Laude, Hambühren (DE); Rainer Risse, Pattensen-Reden (DE); Axel Stender, Hameln (DE); Norbert Witte, Lauenau (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 375 days.

(21) Appl. No.: 16/326,874

(22) PCT Filed: Jun. 20, 2017

(86) PCT No.: PCT/EP2017/000714
§ 371 (c)(1),
(2) Date: Feb. 20, 2019

(87) PCT Pub. No.: WO2018/036643
PCT Pub. Date: Mar. 1, 2018

(65) Prior Publication Data
US 2019/0196463 A1 Jun. 27, 2019

(30) Foreign Application Priority Data
Aug. 20, 2016 (DE) ..................... 10 2016 010 128.8

(51) Int. Cl.
*G05D 1/00* (2006.01)
*B60T 7/16* (2006.01)
(Continued)

(52) U.S. Cl.
CPC ......... *G05D 1/0016* (2013.01); *B60G 17/018* (2013.01); *B60G 17/0155* (2013.01);
(Continued)

(58) Field of Classification Search
CPC .... G05D 1/0016; G05D 1/0022; G05D 1/005; H04W 4/40; H04W 84/12; B60G 17/0155; B60G 17/018; B60T 7/16
See application file for complete search history.

(56) References Cited

U.S. PATENT DOCUMENTS 7,316,406 B2 1/2008 Kimura et al.
10,160,427 B2 12/2018 Risse et al.
(Continued)

FOREIGN PATENT DOCUMENTS

DE 19952575 A1 5/2001
DE 102004050502 A1 5/2005
(Continued)

OTHER PUBLICATIONS

International Search Report for WO Application No. PCT/EP2017/000714, dated Sep. 15, 2017, 2 pages.
(Continued)

*Primary Examiner* — Hussein Elchanti
(74) *Attorney, Agent, or Firm* — Warner Norcross + Judd LLP

(57) ABSTRACT

A method for controlling functions of a vehicle by a remote control unit is provided herein. Signals are transmitted wirelessly between the remote control unit and a station in the vehicle. A data transmission rate depends on a distance between the remote control unit and the station. The data transmission rate is specified. If the data transmission rate is below a defined limit value, the vehicle functions to be controlled are no longer performed or are performed to a restricted extent only and/or the remote control unit emits warning signals.

17 Claims, 1 Drawing Sheet

(51) Int. Cl.
   *H04W 4/40*     (2018.01)
   *B60G 17/015*   (2006.01)
   *B60G 17/018*   (2006.01)
   *H04W 84/12*    (2009.01)

(52) U.S. Cl.
   CPC .............. *B60T 7/16* (2013.01); *G05D 1/005* (2013.01); *G05D 1/0022* (2013.01); *H04W 4/40* (2018.02); *H04W 84/12* (2013.01)

(56) References Cited

U.S. PATENT DOCUMENTS

| | | | |
|---|---|---|---|
| 2001/0038328 A1 | 11/2001 | King et al. | |
| 2004/0239482 A1 | 12/2004 | Fitzgibbon | |
| 2007/0016342 A1* | 1/2007 | Allen | H04L 67/125 |
| | | | 701/2 |
| 2007/0063834 A1 | 3/2007 | Bozzone et al. | |
| 2009/0192674 A1* | 7/2009 | Simons | B60G 17/021 |
| | | | 701/37 |
| 2009/0212905 A1* | 8/2009 | Batz | G07C 9/00944 |
| | | | 340/5.54 |
| 2010/0020355 A1 | 1/2010 | Imai | |
| 2012/0173045 A1* | 7/2012 | Conroy | F41H 5/06 |
| | | | 701/2 |
| 2014/0088794 A1* | 3/2014 | Yashiro | G08C 17/02 |
| | | | 701/2 |
| 2015/0036573 A1* | 2/2015 | Malik | G08C 17/02 |
| | | | 370/311 |
| 2015/0332532 A1 | 11/2015 | Lee et al. | |
| 2017/0177002 A1* | 6/2017 | Ogura | A01B 69/008 |

FOREIGN PATENT DOCUMENTS

| | | |
|---|---|---|
| EP | 1043464 A2 | 11/2000 |
| EP | 2716512 A1 | 4/2014 |
| EP | 2719556 A1 | 4/2014 |
| WO | 2015144284 A1 | 10/2015 |

OTHER PUBLICATIONS

Machine Assisted Translation of DE19952575A1 obtained from https://worldwide.espacenet.com on Feb. 20, 2019, 14 pages.

* cited by examiner

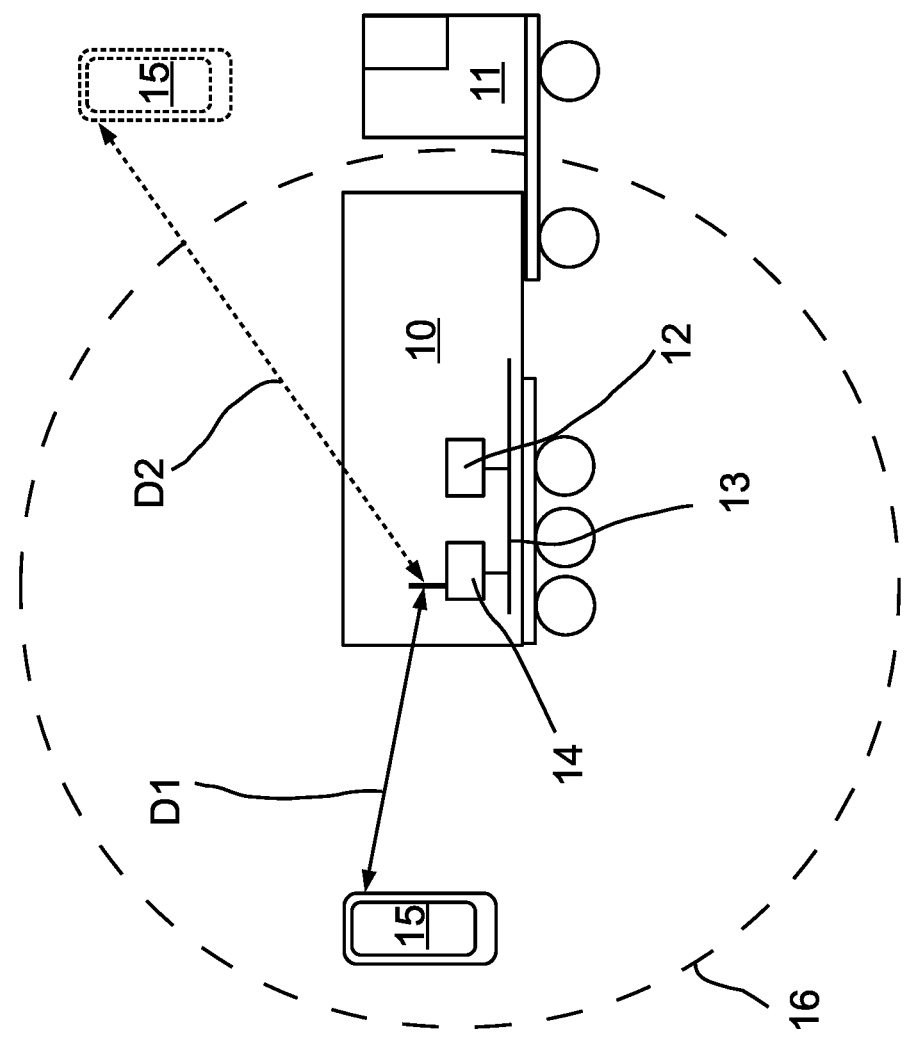

METHOD AND SYSTEM FOR CONTROLLING VEHICLE FUNCTIONS

CROSS-REFERENCE TO RELATED APPLICATIONS

This application is a national phase entry of PCT/EP2017/000714, filed Jun. 20, 2017, which claims priority to German Patent Application No. 10 2016 010 128.8, filed Aug. 20, 2016, both of which are incorporated herein by reference in their entirety.

FIELD OF THE DISCLOSURE

The disclosure relates to a method for controlling vehicle functions by a remote control unit, wherein signals are transmitted wirelessly between the remote control unit and a station in the vehicle, and wherein a data transmission rate depends on a distance between the remote control unit and the station. The disclosure furthermore relates to a system for controlling vehicle functions and a computer program or computer program product.

BACKGROUND

Different functions are regulated electronically by control units in vehicles. Data are also exchanged electronically. In EP 2 719 556 A1, a control unit is disclosed for an electronic braking system in a trailer. A height adjustment of the trailer which has a pneumatic suspension is also possible with the control unit. At the same time, the control unit is linked via a CAN bus to other devices or sensors. These also include a WLAN module which can set up a wireless connection to a WLAN-enabled device outside the vehicle. In EP 2 719 556 A1, a laptop, smartphone and navigation system are mentioned as devices which can be wirelessly connected in this way. Functions of the control unit in the vehicle can thereby be controlled using a smartphone which performs the function of a remote control unit.

The remote operation of vehicle functions is associated with additional risks particularly if the remote control unit is too far away from the vehicle or a user of the remote control unit has only a restricted view of the vehicle. In EP 2 719 556 A1, a method is therefore indicated with which a signal strength for the wireless data transmission is controlled in such a way that the user with the remote control unit is located within a desired distance from the vehicle. The method is disadvantageous at least due to possible interference, as a result of which the signal strength may be totally lost.

BRIEF SUMMARY

A method for controlling functions of a vehicle by a remote control unit is provided herein. Signals are transmitted wirelessly between the remote control unit and a station in the vehicle. A data transmission rate depends on a distance between the remote control unit and the station in the vehicle. The data transmission rate is specified. At a data transmission rate below a defined limit value, the method comprises no longer performing, or performing to a restricted extent only, the vehicle functions to be controlled, and/or emitting warming signals by the remote control unit.

BRIEF DESCRIPTION OF THE DRAWING

The invention is described in greater detail below with reference to the accompanying FIGURE, in which:

FIG. 1 illustrates a vehicle which is connected to a motor vehicle.

DETAILED DESCRIPTION

With reference to the specific embodiment of the FIGURES, wherein like numerals generally indicate like parts throughout the several views, a method and a system with which it can be ensured in a different way that the remote control unit is located at a sufficiently short distance from the vehicle during the transmission of signals is provided herein. The method as contemplated herein provides that the data transmission rate is specified and that, at a data transmission rate below a defined limit value, the vehicle functions to be controlled are no longer performed or are performed to a restricted extent only, and/or the remote control unit emits warning signals.

The control of the vehicle functions is therefore at least restricted below the defined data transmission rate. Alternatively or additionally, signals which are perceptible, in certain embodiments, by the user, are emitted via the remote control unit. Warning signals recognizable by the user are understood to mean all signals which are perceptible by human senses, i.e. in particular visible, audible or tactile signals. For this purpose, the remote control unit has corresponding output devices, such as lights, loudspeakers, a screen, a vibration motor. Any wireless transmission technology in which the data transmission rate also depends on the distance, is suitable for the transmission of the signals. The data transmission rate is specified/monitored continuously or at defined time intervals. As contemplated herein, the data transmission rate is monitored by the remote control unit. Alternatively, the data transmission rate can also be specified/monitored by the station.

As contemplated herein, the remote control unit no longer transmits signals, or transmit signals only to a restricted extent, to the station below the defined limit value. In a restricted transmission, for example, only signals for uncritical control measures are transmitted, such as signals for modifying a lighting of the vehicle or signals for requesting vehicle data. As contemplated herein, the control of vehicle functions may be also understood to mean the provision of vehicle data. Such data can include, but is not limited to, on the one hand, invariable vehicle data for identifying the vehicle and, on the other hand, data from sensors on the vehicle.

As contemplated herein, the wireless transmission of the data is performed via a WLAN, in certain embodiments, according to the IEEE 802.11 standard, successor standards thereto and/or extensions of the standards. The station, in various embodiments, operates in one mode as an access point, while the remote control unit is connected to the station as a WLAN client. However, other standards for a digital radiocommunication transmission can also be applied, such as Bluetooth or mobile radiocommunication standards such as GPRS.

As contemplated herein, the remote control unit is a telephone, in certain embodiments, a smartphone. The latter is provided with suitable software, referred to as an app, to control the vehicle functions.

As contemplated herein, defined data packets may be transmitted as signals between the remote control unit and the station in order to specify the data transmission rate, wherein the transmission of the defined data packets is repeated after defined time intervals. The data transmission rate can also depend on the size of the data packets. The use of defined data packets is therefore advantageous. In certain embodiments, these are data packets which are transmitted solely in order to specify the data transmission rate and have no additional content. The data transmission rate can thus be specified from the number (and size) of the transmitted data packets per time unit. The transmission of the defined data packet is, in various embodiments, repeated at relatively short time intervals, for example every one to two seconds. This time interval should be sufficiently short, since the user with the remote control unit cannot move at any speed.

A system as contemplated herein for controlling vehicle functions, in certain embodiments for carrying out the aforementioned method, has the features described herein. In various embodiments, the system is provided with a remote control unit for the wireless transmission of signals, with a station in the vehicle for the wireless transmission of signals and configured to specify a data transmission rate during the transmission of signals between the remote control unit and the station, wherein, at a data transmission rate below a defined limit value, the vehicle functions to be controlled are no longer performed or are performed to a restricted extent only, and/or warning signals are emitted by the remote control unit.

As contemplated herein, specifying the data transmission rate utilizes components of the remote control unit. For this purpose, the remote control unit can have a corresponding radiocommunication module, possibly in conjunction with software to control the remote control unit. Alternatively, specifying the data transmission rate can utilize components of the station in the vehicle.

As contemplated herein, the remote control unit may contain a WLAN module, as may the station. Correspondingly, the wireless transmission of the signals in a WLAN connection may be performed according to the IEEE802.11 standard and/or successor standards and/or extensions thereto.

As contemplated herein, the remote control unit is a telephone, in certain embodiments, a smartphone. Modern smartphones or cell phones may already be equipped with a WLAN module. Suitable software can be loaded as an app onto the smartphone.

As contemplated herein, a computer program, computer program product or app, are configured to carry out the method described herein and/or for the system described herein.

A data transmission rate, as contemplated herein, is understood to mean any measurable data rate. A data transmission rate is normally understood to mean a gross data rate, i.e. a data throughput, including control data. Conversely, a net data rate designates a data throughput consisting entirely of useful data. The net data rate and gross data rate have a close (but not mathematically exact) relationship with one another, also depending on the radiocommunication technology used and the standard applied. The maximum gross data rate of a WLAN connection according to the IEEE 802.11g standard is therefore 54 Mbit/s. This corresponds to a net data rate of up to 22 Mbit/s. Under these boundary conditions, the limit value for the data transmission rate as a net data rate should, in various embodiments, be between 10 and 20 Mbit/s.

As shown in FIG. 1, in certain embodiments, a vehicle 10 is a semi-trailer which is connected to a motor vehicle 11. The vehicle 10 may have an electronic braking system with a control unit 12 which may be networked via a CAN bus 13 with a WLAN module as a station 14. In a manner not shown, the CAN bus 13 may be connected to a corresponding system in the motor vehicle 11, for example via an interface according to ISO 11992.

In a manner not shown in detail, the vehicle 10 may be equipped with a pneumatic suspension which can be controlled via the control unit 12. In addition, further vehicle functions can be provided which are controllable via signals of the control unit 12.

The vehicle functions can also be controlled remotely by means of the station 14 and a remote control unit 15 which can be actuated by a user (not shown). The remote control unit 15 is, in certain embodiments, a smartphone with application software. Vehicle information can be displayed and the vehicle functions, such a height adjustment of the vehicle 10 by the air suspension, can be controlled in a known manner with the smartphone.

In order to ensure that the user of the remote control unit 15 remains within a narrowly restricted radius of the vehicle 10, a data transmission rate, in certain embodiments a net data transmission rate, may be measured continuously. If the WLAN connection between the remote control unit 15 and the station 14 is set up according to the IEEE 802.11g WLAN standard, a limit value for the net data rate of 15 Mbit/s may be assumed. The data transmission rate may be dependent on a distance D1, D2 between the station 14 and the remote control unit 15. FIG. 1 shows that the remote control unit 15 has only the relatively short distance D1 to the station 14 and is therefore still located within the radius 16. The data transmission rate is correspondingly greater than the defined limit value. The vehicle functions can be controlled without restriction by the remote control unit 15.

Conversely, the remote control unit 15 drawn with dotted lines on the right in the FIGURE is located outside the radius 16 due to its distance D2 to the station 14, for example because the user has moved away from the vehicle 10. The data transmission rate is below the defined limit value. The control of the vehicle functions by the remote control unit is not permitted.

The measurement of the data transmission rate and the comparison with the defined limit value, in certain embodiments, take place in the remote control unit 15. The remote control unit 15 has suitable software for this purpose. Method sequences are furthermore implemented in the software, if the user with the remote control unit 15 moves away from the station 14 and the data transmission rate falls below the defined limit value. A warning, such as a visual or audible signal, may be first emitted on the remote control unit 15. If the data transmission rate drops further, the control of the vehicle functions may no longer be permitted. Conversely, the remote control 15 can indicate that the defined limit value of the data transmission rate has been exceeded as it approaches the station 14 and can permit the control of the vehicle functions.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A method for controlling functions of a vehicle via a remote control unit, wherein signals are transmitted wirelessly between the remote control unit and a station in the vehicle, wherein a data transmission rate depends on a distance between the remote control unit and the station in the vehicle, and wherein the data transmission rate is specified and includes a defined limit value, the method comprising:
   monitoring, at the remote control unit or the station, the data transmission rate between the remote control unit and the station;
   controlling, by the remote control unit, a vehicle function if the data transmission rate is at least equal to the defined limit value;
   no longer performing by the remote control unit, or performing by the remote control unit to a restricted extent only, the vehicle function when the data transmission rate declines to below the defined limit value; and
   emitting warning signals by the remote control unit when the data transmission rate is below the defined limit value to indicate the vehicle function is no longer performed by the remote control unit or is performed by the remote control unit to a restricted extent.

2. The method as claimed in claim 1, wherein the data transmission rate is monitored by the remote control unit.

3. The method as claimed in claim 1, wherein the remote control unit no longer transmits signals to the station or transmits signals to a restricted extent only below the defined limit value of the data transmission rate.

4. The method as claimed in claim 1, wherein the wireless data transmission is performed via a WLAN.

5. The method as claimed in claim 1, wherein the remote control unit is a telephone.

6. The method as claimed in claim 5, wherein the remote control unit comprises a smartphone.

7. The method as claimed in claim 1, wherein defined data packets are transmitted as signals between the remote control unit and the station in order to specify the data transmission rate, and wherein the transmission of the defined data packets is repeated after defined time intervals.

8. A non-transitory computer-readable medium with instructions that, when executed, cause the remote control unit to carry out the method as claimed in claim 1.

9. The method as claimed in claim 1, wherein the vehicle comprises an electronic braking system with a control unit which is in communication with the station.

10. The method as claimed in claim 1, wherein the vehicle comprises a pneumatic suspension with a control unit which is in communication with the station.

11. A system for controlling functions of a vehicle, the system comprising:
   a remote control unit for the wireless transmission of signals, and
   a station in the vehicle for the wireless transmission of signals and configured to specify a data transmission rate during the transmission of signals between the remote control unit and the station;
   wherein the remote control unit or the station is adapted to monitor the data transmission rate between the remote control unit and the station;
   wherein, at a data transmission rate at least equal to a defined limit value, a vehicle function is performed by the remote control unit;
   wherein, at a data transmission rate that declines to below the defined limit value:
      the vehicle functions to be controlled by the remote control unit are no longer performed by the remote control unit or are performed by the remote control unit to a restricted extent only, and
      warning signals are emitted by the remote control unit to indicate the vehicle function is no longer performed by the remote control unit or is performed by the remote control unit to a restricted extent.

12. The system as claimed in claim 11, wherein the system further comprises components of the remote control for specifying the data transmission rate.

13. The system as claimed in claim 11, wherein each of the remote control unit and the station, comprises a WLAN module.

14. The system as claimed in claim 11, wherein the remote control unit is a telephone.

15. The system as claimed in claim 14, wherein the remote control unit comprises a smartphone.

16. The system as claimed in claim 11, wherein the vehicle comprises an electronic braking system with a control unit which is in communication with the station.

17. The system as claimed in claim 11, wherein the vehicle comprises a pneumatic suspension with a control unit which is in communication with the station.

* * * * *